(12) United States Patent
Izumi et al.

(10) Patent No.: US 9,948,153 B2
(45) Date of Patent: Apr. 17, 2018

(54) STACKED CORE HAVING A PLURALITY OF CORE PIECES AND A BRIDGE PORTION

(71) Applicants: MITSUI HIGH-TEC, INC., Kitakyushu-shi, Fukuoka (JP); TOYOTA JIDOSHA KABUSHIKI KAISHA, Aichi-ken (JP)

(72) Inventors: Masahiro Izumi, Fukuoka (JE); Shinya Sano, Toyota (JP)

(73) Assignees: MITSUI HIGH-TEC, INC., Fukuoka (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 109 days.

(21) Appl. No.: 14/621,884

(22) Filed: Feb. 13, 2015

(65) Prior Publication Data
US 2015/0244244 A1    Aug. 27, 2015

(30) Foreign Application Priority Data

Feb. 24, 2014 (JP) ................................ 2014-033072
Dec. 16, 2014 (JP) ................................ 2014-254233

(51) Int. Cl.
*H02K 1/27* (2006.01)

(52) U.S. Cl.
CPC ...... *H02K 1/2766* (2013.01); *Y10T 29/49012* (2015.01)

(58) Field of Classification Search
CPC .......................... H02K 1/2766; Y10T 29/49012
See application file for complete search history.

(56) References Cited

U.S. PATENT DOCUMENTS

| 7,698,803 B2* | 4/2010 | Mitsui ................. H02K 15/026 |
| | | 29/596 |
| 7,843,101 B2 | 11/2010 | Ito et al. |
| 8,541,919 B2 | 9/2013 | Lokhandwalla et al. |
| 8,869,379 B2 | 10/2014 | Mabu et al. |
| 9,431,883 B2* | 8/2016 | Matsubayashi .... H02K 15/0025 |
| 2003/0201685 A1 | 10/2003 | Shimada et al. |
| 2007/0126304 A1 | 6/2007 | Ito et al. |

(Continued)

FOREIGN PATENT DOCUMENTS

| CN | 1835340 | 9/2006 |
| CN | 1976171 | 6/2007 |

(Continued)

OTHER PUBLICATIONS

Office Action in related Chinese Patent Application No. 201510087435.9, with English language translation, dated Dec. 26, 2016.

(Continued)

*Primary Examiner* — Minh Trinh
(74) *Attorney, Agent, or Firm* — Greenblum & Bernstein, P.L.C.

(57) ABSTRACT

A stacked core includes a plurality of core pieces that are arranged in a stack. Each of the core pieces has a plurality of magnet insertion holes. A bridge is provided between a radially-outer end of each of the magnet insertion holes and an outer region of each of the core pieces, A radially-outer contour of the bridge is provided on a radially-inner side of a blanking-contour line of each of the core pieces.

3 Claims, 8 Drawing Sheets

(56) References Cited

U.S. PATENT DOCUMENTS

| | | | |
|---|---|---|---|
| 2011/0133590 A1 | 6/2011 | Lokhandwalla et al. | |
| 2012/0223609 A1* | 9/2012 | Kojima | H02K 15/026 |
| | | | 310/216.041 |
| 2014/0230236 A1 | 8/2014 | Hashimoto et al. | |

FOREIGN PATENT DOCUMENTS

| | | |
|---|---|---|
| CN | 102170185 | 8/2011 |
| CN | 102222996 | 10/2011 |
| CN | 103001441 | 3/2013 |
| JP | 63-001347 | 1/1988 |
| JP | 04-117153 | 4/1992 |
| JP | 2004-007943 | 1/2004 |
| JP | 2005-185081 | 7/2005 |
| JP | 2009-44795 | 2/2009 |
| JP | 2009-153236 | 7/2009 |
| JP | 2013-66339 | 4/2013 |

OTHER PUBLICATIONS

Office Action from Japan Patent Office (JPO) in Japanese Patent Appl. No. 2014-254233, dated Oct. 3, 2017, together with an English language translation.

* cited by examiner

PRIOR ART

STACKED CORE HAVING A PLURALITY OF CORE PIECES AND A BRIDGE PORTION

CROSS REFERENCE TO RELATED APPLICATIONS

The present application is based on and claims the priority of the Japanese patent application No. 2014-33072 filed on Feb. 24, 2014 and the Japanese patent application No. 2014-254233 filed on Dec. 16, 2014, the contents of which are incorporated herein by reference in its entirety.

BACKGROUND OF THE INVENTION

1. Field of the Invention

The present invention relates to a method of punching blanking core pieces of a rotor core of a magnet-embedded motor, and a stacked core obtained by stacking the core pieces.

2. Description of the Related Art

In designing a magnet-embedded motor, there is a tendency of decreasing the width of a bridge formed between a magnet insertion hole and an outer circumference of a rotor core so as to improve the characteristics of the motor (refer to JP-A-2013-66339).

FIG. 8A illustrates a part of a rotor core 70 according to an example in the related art. In this example, the width of each of bridges 74 and 75 between a pair of magnet insertion holes 71 and 72 and an outer circumference 73 is further reduced. As illustrated in FIGS. 8B and 8C, the rotor core 70 is manufactured by forming core pieces 77 via a plurality of processes. FIG. 8A also illustrates permanent magnets 71a and 72a.

In the manufacturing of the core piece 77, as illustrated in FIG. 8B, a stripper 79 holds a magnetic steel sheet 78 on a die 80, and the magnet insertion hole 71 (72) is formed by punching with a die 81. Subsequently, as illustrated in FIG. 8C, a stripper 82 holds the magnetic steel sheet 78 on a die 83 at a downstream station, and the core pieces 77 are punched out from the magnetic steel sheet 78 using a punch 84 and fall into the die 83 to be stacked on each other. FIGS. 8B and 8C indicate a bridge 85 (equivalent to the bridges 74 and 75 in FIG. 8A).

SUMMARY OF THE INVENTION

In the method of manufacturing the core pieces described above, since a clockwise moment M1 is applied to the bridge 85 in the process illustrated in FIG. 8B, and a clockwise moment M2 is also applied to the bridge 85 in the process illustrate in FIG. 8C, the bridge 85 is considerably deflected. The deflection becomes significant enough to the extent that the width of the bridge 85 is reduced.

When these core pieces are assembled into the rotor core, the shape of the rotor core deteriorates, and these core pieces may cause a lack of strength or adversely affect the characteristics of the motor.

The present invention is made in light of the problem, and one non-limited object of the present invention is to provide a method of punching a core piece having a less twisted bridge, accurate shape dimensions, and offering good characteristics for a motor, and to provide a stacked core that is obtained by stacking the core pieces.

A first aspect of the present invention provides a method of punching a core piece having a bridge formed between a radially-outer end of a magnet insertion hole and an outer region of the core piece, the method including: punching out the magnet insertion hole; forming a through hole that defines a radially-outer contour of the bridge; and blanking the core piece in an exterior shape with a punch while avoiding an edge of the punch from coinciding with the radially-outer contour of the bridge.

A second aspect of the present invention provides the method of punching the core piece according to the first aspect, wherein the core piece is blanked while positioning the edge of the punch inside the through hole.

A third aspect of the present invention provides the method of punching the core piece according to the first aspect, wherein the core piece is blanked while positioning the edge of the punch at a center of the through hole.

A fourth aspect of the present invention provides the method of punching the core piece according to the first aspect, further including coining a region for forming the bridge before forming the through hole that defines the radially-outer contour of the bridge.

A fifth aspect of the present invention provides the method of punching the core piece according to the fourth aspect, further including providing a relief hole on each of a radially-outer side and a radially-inner side of the bridge prior to punching out the magnet insertion hole and forming the through hole, the relief hole absorbing an extension of the core piece originating from the coining.

A sixth aspect of the present invention provides the method of punching the core piece according to any one of the first to fifth aspects, wherein in forming the through hole, the through hole is formed via punching in a state where a load of a stripper for pressing the bridge is increased further than that applied to other portions.

A seventh aspect of the present invention provides the method of punching the core piece according to any one of the first to sixth aspects, wherein the magnet insertion hole is split into a plurality of magnet insertion holes by a crosspiece, and the split magnet insertion holes are sequentially or simultaneously punched out while the crosspiece is interposed therebetween.

An eighth aspect of the present invention provides the method of punching the core piece according to the seventh aspect, wherein a load of the stripper for holding the crosspiece is increased so as to form the split magnet insertion holes via punching.

A ninth aspect of the present invention provides the method of punching the core piece according to any one of the first to eighth aspects, wherein the bridge has a width of 1.0 mm or less.

A tenth aspect of the present invention provides a stacked core in which core pieces are stacked, each core piece having a plurality of magnet insertion holes and a bridge formed between a radially-outer end of each magnet insertion hole and an outer region of the core piece, wherein a radially-outer region and a radially-inner region of the bridge are sheared in a same direction.

An eleventh aspect of the present invention provides the stacked core according to the tenth aspect, wherein a thickness of the bridge is reduced via coining.

A twelfth aspect of the present invention provides the stacked core according to the tenth or eleventh aspect, including a non-core region formed between a long side on a radially-outer side of the magnet insertion hole and the outer region of the core piece.

A thirteenth aspect of the present invention provides a stacked core in which core pieces are stacked, each core piece having a plurality of magnet insertion holes and a bridge formed between a radially-outer end of each magnet insertion hole and an outer region of the core piece, wherein a radially-outer contour of the bridge is positioned on an radially-inner side of a blanking-contour line of the core piece.

A fourteenth aspect of the present invention provides the stacked core according to the thirteenth aspect, wherein a thickness of the bridge is reduced via coining.

A fifteenth aspect of the present invention provides the stacked core according to the thirteenth or fourteenth aspect, including a non-core region formed between a long side on a radially-outer side of the magnet insertion hole and the outer region of the core piece.

According to the first to ninth aspects of the present invention, in the method of punching the core piece having the bridge formed between the radially-outer end of the magnet insertion hole and the outer region of the core piece, the method includes forming the through hole that defines the radially-outer contour of the bridge, the bridge is unlikely to be deflected. Thus, it is possible to prevent the deformation of the core piece or a decrease in the strength thereof, the accuracy of the shape of a rotor core is maintained, and the characteristics of a motor do not deteriorate.

In particular, in the method of punching the core piece according to the fourth aspect of the present invention, the region for forming the bridge is subjected to coining prior to forming the through hole that defines the radially-outer contour of the bridge. Thus, the coined region is hardened, the deflection of the region is further prevented, and the magnetic characteristics in the region of the bridge are lowered, thereby reducing leakage of magnetic flux.

In the method of punching a core piece according to the fifth aspect of the present invention, since the relief holes are respectively formed on the opposite sides of the bridge, it is possible to smoothly perform the coining by ensuring relief regions for the coining.

In the method of punching a core piece according to the sixth aspect of the present invention, in forming the through hole, since the through hole is formed via punching in a state where a load of the stripper for pressing the bridge is increased further than that applied to other portions, it is possible to reliably prevent the deformation of the bridge.

In the method of punching a core piece according to the seventh aspect of the present invention, since the magnet insertion hole is split into the plurality of magnet insertion holes by the crosspiece, and the split magnet insertion holes are sequentially or simultaneously punched out while the crosspiece is interposed therebetween, the crosspiece is unlikely to be deflected, and it is possible to prevent the deformation of the crosspiece.

In the method of punching a core piece according to the eighth aspect of the present invention, since a load of the stripper for holding the crosspiece is increased so as to form the split magnet insertion holes via punching, it is possible to more rigidly hold the shape and the posture of the crosspiece when the punching is performed.

In the method of punching a core piece according to the ninth aspect of the present invention, since the bridge has the width of 1.0 mm or less, a rotor core having better magnetic efficiency is obtained.

In the stacked core according to the tenth aspect of the present invention, in which core pieces are stacked, each core piece having a plurality of magnet insertion holes and a bridge formed between a radially-outer end of each magnet insertion hole and an outer region of the core piece, the radially-outer region and the radially-inner region of the bridge are sheared in the same direction. Thus, the deflection of the bridge is reduced, and the rotor core having better efficiency is obtained.

In the stacked core according to the thirteenth aspect of the present invention, in which core pieces are stacked, each core piece having a plurality of magnet insertion holes and a bridge formed between a radially-outer end of each magnet insertion hole and an outer region of the core piece, a radially-outer contour of the bridge is positioned on an radially-inner side of a blanking-contour line of the core piece. Thus, the bridge is unlikely to be deflected. Thus, it is possible to prevent the deformation of the core piece or a decrease in the strength thereof, the accuracy of the shape of a rotor core is maintained, and the characteristics of a motor do not deteriorate.

In the stacked core according to the eleventh or fourteenth aspect of the present invention, since the bridge is subjected to the coining, this coined portion is hardened and is unlikely to be deflected, and the magnetic characteristics in the region of the bridge are lowered, thereby improving the efficiency of the motor.

In the stacked core according to the twelfth or fifteenth aspect of the present invention, since the non-core region is formed between the long side on the radially-outer side of the magnet insertion hole and the outer region of the core piece, leakage of magnetic flux is reduced.

DETAILED DESCRIPTION OF THE EXEMPLARY EMBODIMENTS

Figure 1A:
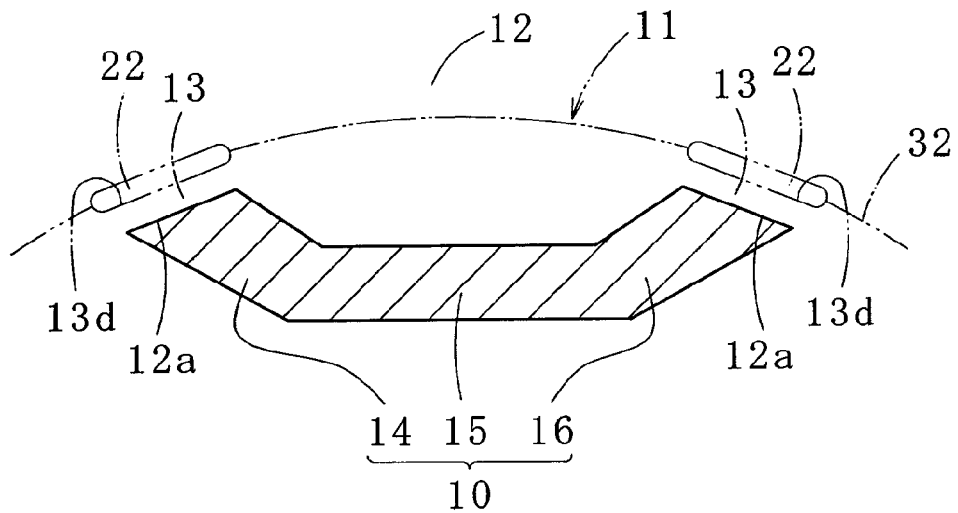
FIG. 1A is a partial plan view illustrating a method of punching a core piece according to a first embodiment of the present invention.

Subsequently, in order to help understanding the present invention, some exemplary embodiments of the present invention will be described with reference to the accompanying drawings.

A core piece 11 is formed using a method of punching a core piece according to a first embodiment of the present invention. As illustrated in FIGS. 1A to 3B, the core piece 11 has a circular outer circumference, and includes a shaft hole (not illustrated) at the center thereof; and a plurality of magnet insertion holes 10 on the circumference thereof; and a bridge 13 formed between a radially-outer end 12a of each magnet insertion hole 10 and an outer region (outer circumferential portion) 12 of the core piece 11. That is, an outer end portion of the magnet insertion hole 10 is closed by the bridge 13. In the present embodiment, the magnet insertion hole 10 has a permanent magnet insertion portion 15 into which a permanent magnet is fitted, and cavity portions 14 and 16 which are filled with resin for fixing the permanent magnet. Here, it is possible that the permanent magnet insertion portion 15 is not formed at the center, and alternatively, the cavity portions 14 and 16 on the opposite sides may act as permanent magnet insertion portions.

Figure 1B:
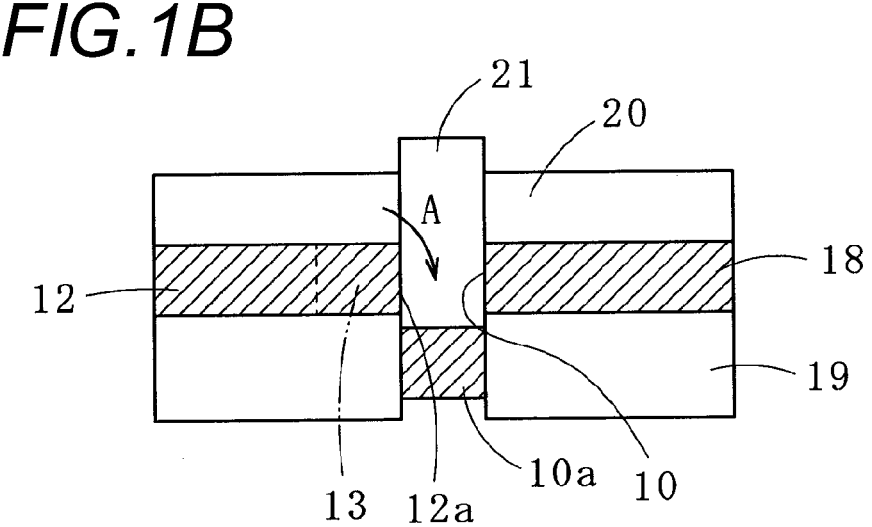
FIG. 1B is a partial cross-sectional view illustrating the method in FIG. 1A.

In the method of punching a core piece according to the first embodiment, before or after the shaft hole is formed using a known method, as illustrated in FIGS. 1A and 1B, in a state where a magnetic steel sheet (bar) 18 (the material of the core piece 11) having a thickness of 0.15 mm to 0.5 mm is placed on a die 19, and is held on the die 19 using a stripper 20, the magnet insertion hole 10 is formed by punching with a punch 21.

By this operation, a radially-outer end 12a of the magnet insertion hole 10 is formed to be a radially-inner end of the bridge 13. The bridge 13 is required to ensure the strength of the magnet insertion hole 10; however, when the width of the bridge 13 increases, leakage of magnetic flux is increased, and the magnetic efficiency of a rotor core decreases. Accordingly, the bridge 13 is set to have a width of 0.2 mm to 1.0 mm (approximately 2 to 3 times the thickness of the magnetic steel sheet 18). FIG. 1B illustrates a punching scrap 10a.

In the work of forming the magnet insertion hole 10, as illustrated in FIG. 1B, a clockwise moment A is applied to the bridge 13.

Figure 2A:
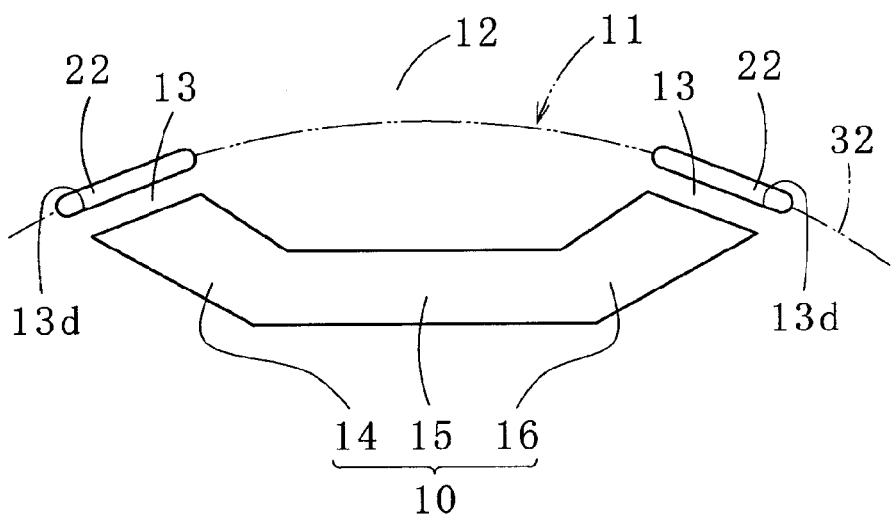
FIG. 2A is a partial plan view illustrating the method of punching a core piece according to the first embodiment of the present invention.
Figure 2B:
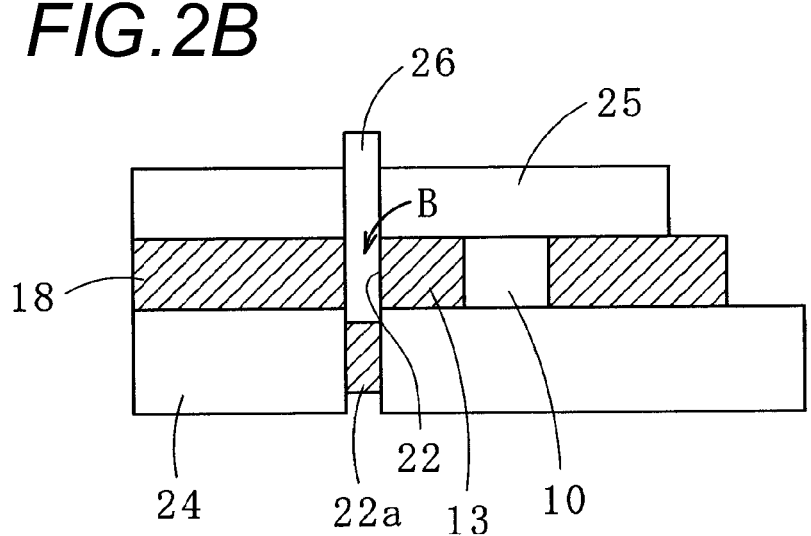
FIG. 2B is a partial cross-sectional view illustrating the method in FIG. 2A.

Subsequently, as illustrated in FIGS. 2A and 2B, in a state where the magnetic steel sheet 18 is placed on a predetermined die 24 at another station, and is press-held using a stripper 25, a through hole 22 is punched out from the magnetic steel sheet 18 using a punch 26, and thereby the bridge 13 is formed. At this time, as illustrated in FIG. 2B, a counter-clockwise moment B is applied to the bridge 13. Since the moment A and the moment B are applied in opposite directions, the moment A and the moment B cancel out each other, and thereby no moment is applied to the bridge 13. FIG. 2B illustrates a punching scrap 22a. A radially-inner side of the through hole 22 defines a radially-outer contour 13d of the bridge 13.

Since the moment A and the moment B are applied to the bridge 13 in the opposite directions, and cancel out each other, when the core piece 11 is blanked out, the deflection of the bridge 13 is minimized, and thereby it is possible to obtain the core piece 11 as designed, and to improve the accuracy and the magnetic efficiency of the rotor core (i.e., stacked core) that is obtained by stacking these core pieces 11.

Figure 3A:
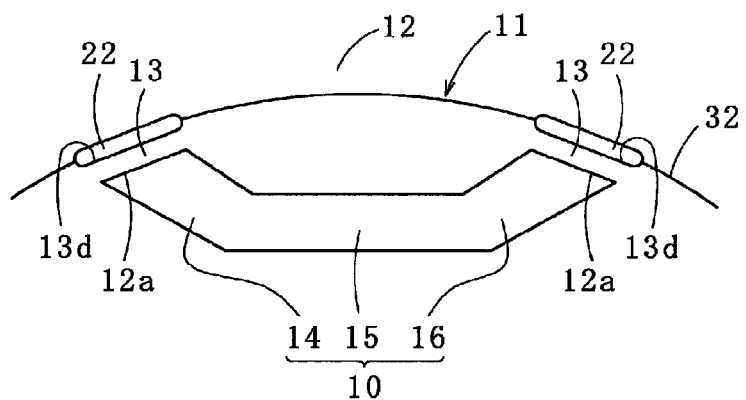
FIG. 3A is a partial plan view illustrating the method of punching a core piece according to the first embodiment of the present invention.
Figure 3B:
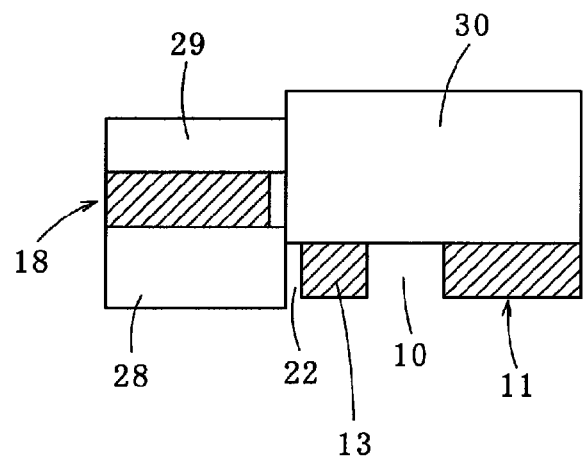
FIG. 3B is a partial cross-sectional view illustrating the method in FIG. 3A.

Thereafter, as illustrated in FIGS. 3A and 3B, the magnetic steel sheet 18 is located and disposed on the die 28, and is pressed using a stripper 29, each core piece is blanked in an exterior shape using a punch 30, and the core pieces 11 are stacked and caulked in the die 28. At this time, a blanking-contour line 32 is preferably positioned at the center of the through hole 22; however, the through hole 22 may slightly deviate with respect to the blanking-contour line 32 in a radial direction as far as an edge (corresponding to the blanking-contour line 32) of the punch 30 is positioned inside the through hole 22. That is, the core piece 11 is blanked via punching while avoiding the edge of the punch 30 from coinciding with the radially-outer contour 13d of the bridge 13.

Blanking process in the exterior shape is performed in such a manner that the radially-outer contour 13d of the bridge 13 is positioned on an radially-inner side of the blanking-contour line 32 of the core piece 11. Accordingly, it is possible to prevent double cutting with the punch.

In the method of punching a core piece, the magnetic steel sheet 18 is sheared downward in a radially-outer region and a radially-inner region of the bridge 13, that is, the shearing directions are the same, and thereby it is possible to obtain the core piece 11 having a less deflected bridge 13. As a result, a stacked core having good dimensional accuracy and good magnetic properties is obtained (the same effects are obtained in the following embodiments).

Subsequently, a method of punching a core piece according to a second embodiment of the present invention will be described with reference to FIG. 4.

In forming the bridge 13 using the method of punching a core piece according to the first embodiment, a lateral end of the bridge 13 is formed, and then the other lateral end of the bridge 13 is formed. That is, since the punching is not simultaneously performed but sequentially formed, the bridge 13 is slightly deflected.

Figure 4:
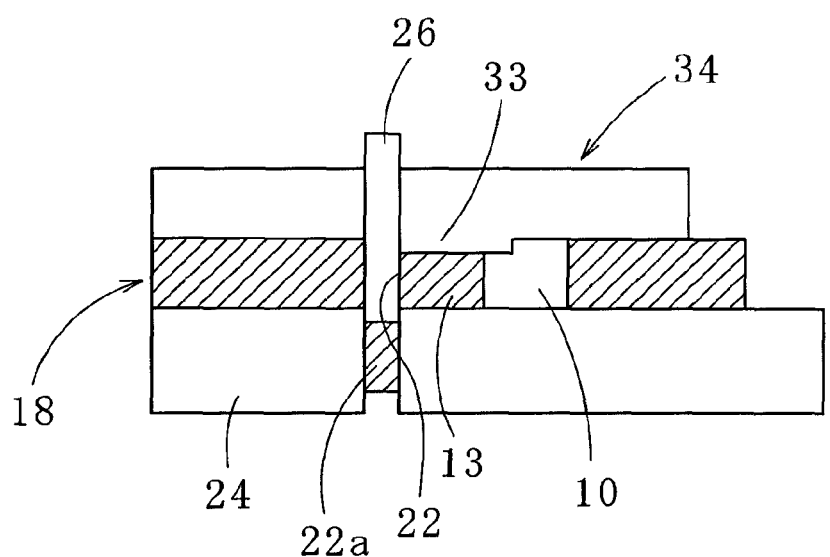
FIG. 4 is a diagram illustrating a method of punching a core piece according to a second embodiment of the present invention.

In the process of forming the bridge 13 (that is, the process of forming the through hole 22), as illustrated in FIG. 4, a stripper 34 having a bottom portion 33 (the bottom portion being positioned close to the bridge 13) protruding approximately 0.002 mm to 0.2 mm is used instead of the flat stripper 25 having the same level of a bottom portion as illustrated in FIGS. 2A and 2B. Accordingly, it is possible to press the bridge 13 with a load higher than that applied to other portions while correcting the bridge 13. The other processes are the same as those in the method of punching a core piece according to the first embodiment.

Figure 5:
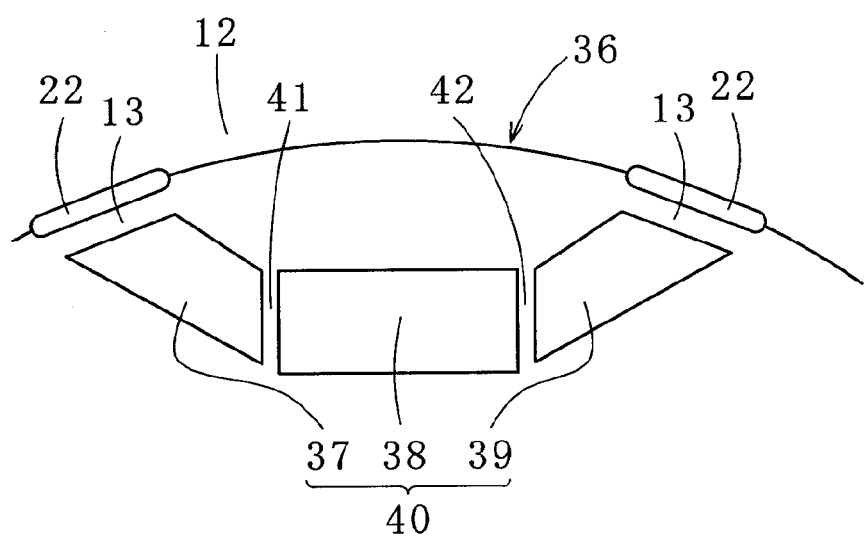
FIG. 5 is a diagram illustrating a method of punching a core piece according to a third embodiment of the present invention.

Subsequently, FIG. 5 illustrates a method of punching a core piece according to a third embodiment. A core piece 36 is provided with a magnet insertion hole group 40 having a plurality of (three in the embodiment) split magnet insertion holes 37 to 39. A bridge 41 is formed between the magnet insertion hole 37 and the magnet insertion hole 38, and a bridge 42 is formed between the magnet insertion hole 38 and the magnet insertion hole 39. Each of the bridges 41 and 42 is an example of a crosspiece, and has a narrow width of approximately 0.5 mm to 1 mm.

Since the bridges 41 and 42 are formed by punching out the magnet insertion holes 37 to 39 on opposite sides of the bridges 41 and 42, the same moment is not applied thereto during the punching process, and the bridges 41 and 42 are likely to be deflected due to a narrow width of each of the bridges 41 and 42. It is possible to form the bridges 41 and 42 using the method of punching a core piece according to the second embodiment of the present invention described above. In this case, since a stripper having a protruding bottom portion is used, it is possible to maintain a flatter state by increasing a load of the stripper applied to the bridges 41 and 42 on a die, and binding the bridges 41 and 42 using the stripper.

The bridges 13 are formed between a radially-outer end of the first magnet insertion hole 37 and the outer region 12, and between a radially-outer end of the third magnet insertion hole 39 and the outer region 12. The bridge 13 is formed using the method of punching a core piece according to the first embodiment, or the method of punching a core piece according to the second embodiment. The punches for forming the magnet insertion holes 37 to 39 may be simultaneously operated, or may be sequentially operated.

Subsequently, a method of punching a core piece according to a fourth embodiment of the present invention will be described with reference to FIGS. 6A to 6E.

Since the method of punching a core piece according to the fourth embodiment is an improvement of the methods of punching a core piece according to the first to third embodiments described above, the following description will be given on condition that the same reference signs and numerals will be assigned to the same configuration elements as in the method of punching a core piece according to the first embodiment.

Figure 6A:
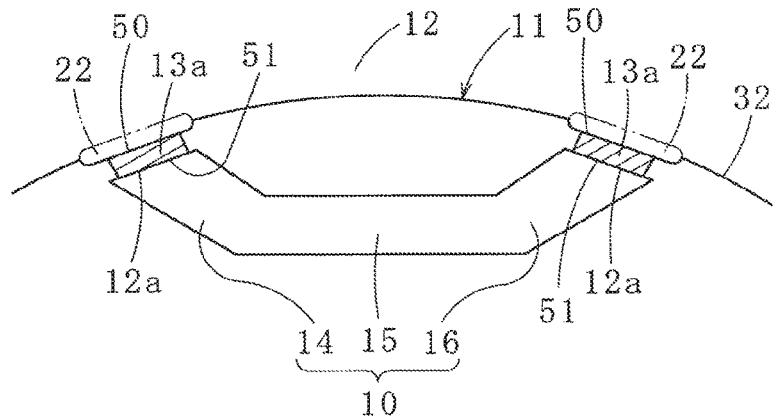
FIGS. 6A to 6E are diagrams illustrating a method of punching a core piece according to a fourth embodiment of the present invention.
Figure 6B:
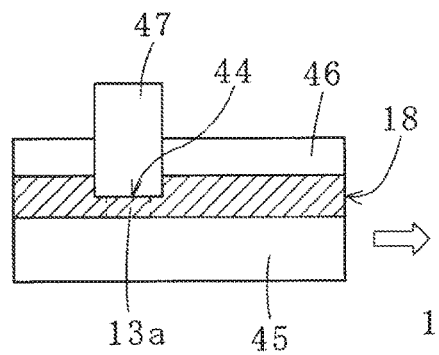

First, as illustrated in FIG. 6B, the thickness of a region 44 including a bridge 13a of the core piece 11 is reduced via coining. In the coining process, in a state where the magnetic steel sheet 18 is placed on a flat die 45, and the circumference thereof is pressed using a stripper 46, the region 44 including the bridge 13a is pressed using a coining punch 47, and the structure of the region 44 is modified. At this time, pilot holes or the like are formed in the magnetic steel sheet 18, but the magnet insertion hole 10 is not formed yet.

Figure 6C:
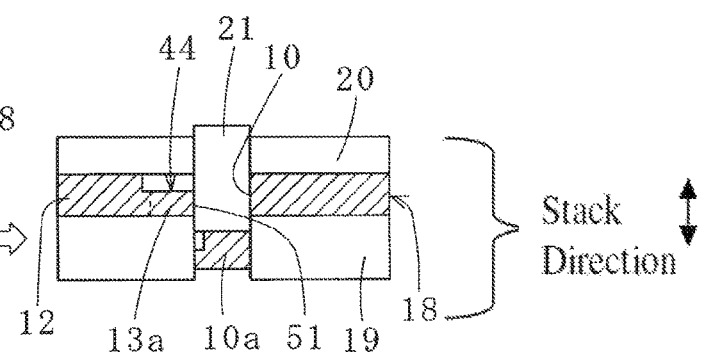
Figure 6D:
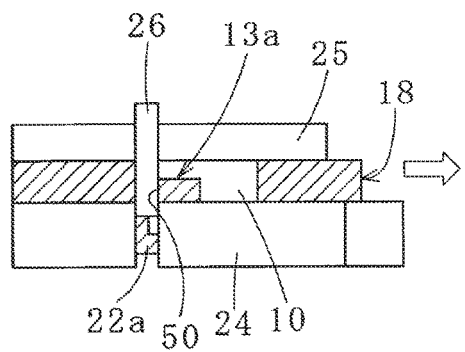

Subsequently, as illustrated in FIG. 6C, in a state where the magnetic steel sheet 18 is placed at a predetermined position on the die 19, and is pressed using the stripper 20, the magnet insertion hole 10 is formed using a punch 21. At this time, a radially-inner end 51 (equivalent to the radially-outer end 12a of the magnet insertion hole 10) of the bridge 13a is formed. Thereafter, as illustrated in FIG. 6D, in a state where the magnetic steel sheet 18 is pressed using the stripper 25, a radially-outer end (outer contour) 50 of the bridge 13a is formed using the die 24 and the punch 26 (the formation of the through hole 22). One of the radially-outer end 50 and the radially-inner end 51 may be formed earlier than the other.

Figure 6E:
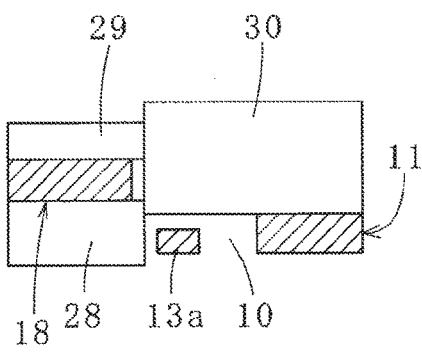

Thereafter, as illustrated in FIG. 6E, the magnetic steel sheet 18 (the core piece 11 having an outer frame attached thereto) is placed on the die 28, the circumference thereof is pressed using the stripper 29, and the core piece 11 is blanked as a product via punching by pressing a punch 30 downward. Since the radially-inner end 51 and the radially-outer end 50 of the bridge 13a are respectively formed using the punch 21 and the die 19, and the punch 26 and the die 24, and have the same shearing directions in the pressing process, the bridge 13a is unlikely to be deflected.

FIG. 6A illustrates the details of the core piece 11 manufactured by the method of punching a core piece according to the fourth embodiment. The bridges 13a are respectively provided on the opposite sides of the magnet insertion hole 10, and the bridge 13a is formed by the through hole 22 formed in such a manner as to intersect the blanking-contour line 32 of the core piece 11, and the magnet insertion hole 10. The bridge 13a is subjected to the coining before being subjected to the pressing process, and thereby the thickness of the bridge 13a is reduced to 50% to 90% of the original thickness of the base material. Accordingly, the cross-sectional area of the bridge 13a is reduced, the shape of the core piece is changed, magnetic resistance increases, leakage of magnetic flux from a permanent magnet is reduced, and the magnetic efficiency of the stacked core improves.

Figure 7:
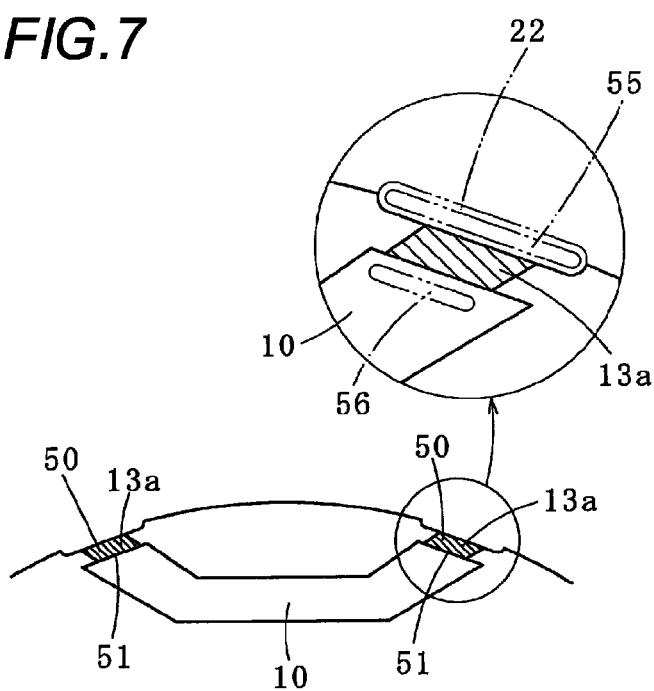
FIG. 7 is a diagram illustrating a method of punching a core piece according to a fifth embodiment of the present invention.

Subsequently, a method of punching a core piece according to a fifth embodiment of the present invention will be described with reference to FIG. 7. In the method of punching a core piece according to the fourth embodiment described with reference to FIGS. 6A to 6E, since a partial region (the region corresponding to the bridge 13a) of the magnetic steel sheet 18 is subjected to the coining, the magnetic steel sheet 18 is distorted and has residual stress. After the through hole 22 and the magnet insertion hole 10 are formed via pressing, the coined region and the vicinity thereof are distorted.

Prior to the process of punching the magnet insertion hole 10 out, and the process of forming the through hole 22, long holes (examples of a relief hole) 55 and 56 are formed along the coined region, that is, on the opposite sides (the radially-outer and inner sides) of the bridge 13a in advance. Accordingly, in the coining process, the extension of the core piece 11 is absorbed by the long holes 55 and 56, stress is released, and a large residual stress does not occur. Thereafter, the through hole 22 and the magnet insertion hole 10 are sequentially formed, and the radially-outer end 50 and the radially-inner end 51 of the bridge 13a are formed. The long hole 55 is removed by the formation of the through hole 22, and the long hole 56 is removed by the formation of the magnet insertion hole 10.

Figure 8A:
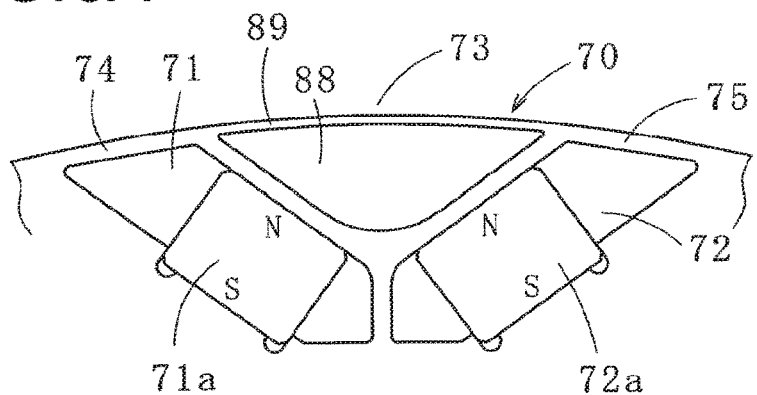
FIGS. 8A to 8C are diagrams illustrating a method of punching a core piece according to an example in the related art.
Figure 8B:
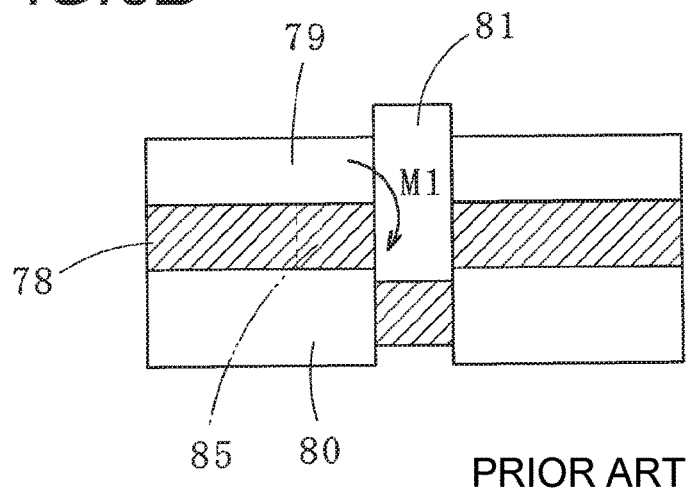
Figure 8C:
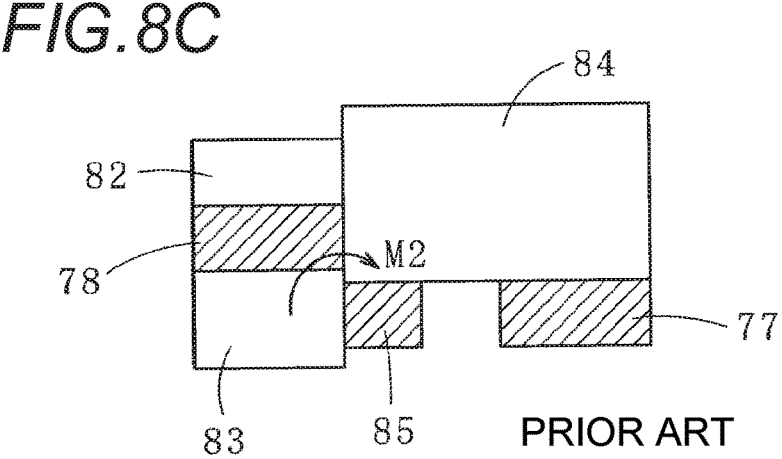

It is also possible to form a through hole (denoted by reference sign 88 in FIG. 8A), that is, a non-core region between a blanking-contour line (outer region) of a core piece and a long side on a radially-outer side of a magnet insertion hole in which two or three permanent magnets are disposed side by side. The method of punching a core piece according to any one of the first to fifth embodiments is also applied for the formation of a bridge 89 that is formed by the through hole 88 and the blanking-contour line, thereby improving the efficiency of the permanent magnet inserted into the magnet insertion hole.

The present invention is not limited to the embodiments, and improvement or modifications may be made to the present invention insofar as the improvement and the modifications do not depart from the spirit of the present invention. For example, in the description of the embodiments, specific numerals are used; however, the numerals can be changed insofar as the changes do not adversely affect the spirit of the present invention. For example, the radially-outer contour of the bridge formed by the through hole 22 may be formed to be longer than, the same as, or shorter than the side length of the radially-outer end 12a of the magnet insertion hole 10.

In the fourth and fifth embodiments, any one of a top surface and a back surface of the magnetic steel sheet may be subject to the coining.

What is claimed is:
1. A stacked core comprising:
   a plurality of core pieces in a stack, each of the core pieces having a plurality of magnet insertion holes; and
   a bridge provided between a radially-outer end of each of the magnet insertion holes and an outer region of each of the core pieces,
   wherein a radially-outer contour of the bridge is provided on a radially-inner side of a blanking-contour line of each of the core pieces,
   wherein a thickness of the bridge in a stack direction of the core pieces is smaller relative to an area adjacent to the bridge.
2. The stacked core according to claim 1, further comprising:
   a non-core region provided between a long side on a radially-outer side of each of the magnet insertion holes and the outer region of each of the core pieces.
3. The stacked core according to claim 1, further comprising:

a through hole having a radially inner side which defines the radially-outer contour of the bridge.

* * * * *